W. AGER.

Millstone Dress.

No. 9,063.

Patented June 29, 1852.

UNITED STATES PATENT OFFICE.

WILSON AGER, OF ROHERSBURGH, PENNSYLVANIA.

MILLSTONE-DRESS.

Specification of Letters Patent No. 9,063, dated June 29, 1852.

*To all whom it may concern:*

Be it known that I, WILSON AGER, of Rohersburgh, in the county of Columbia and State of Pennsylvania, have invented a new and useful Improvement in the Manner of Dressing Millstones for Grinding Buckwheat; and I do hereby declare the following to be a full, clear, and exact description of the same, reference being had to the accompanying drawings, making a part thereof, in which—

Figure 1:
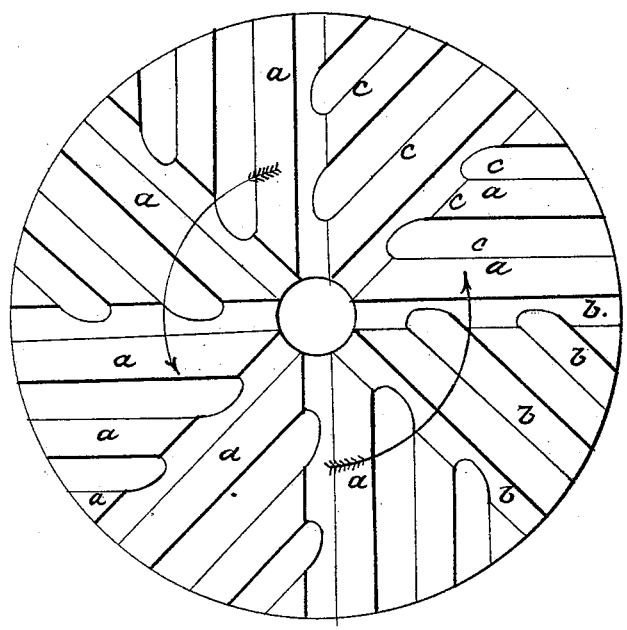
Figure 2:
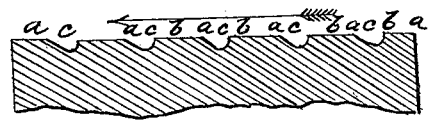

Figure 1, represents the face of the runner (the bed stone being dressed in precisely the same manner, with the grooves included in the contrary direction); and Fig. 2, a broken side view of Fig. 1, and showing the rounding off, of what is usually denominated the feathered edges of the burrs.

Similar letters in both the figures represent the same parts.

The grooves in the bur stones heretofore used for grinding buckwheat, have invariably been dressed, in the same manner as those used for grinding other grains. This I have discovered cuts the hull which covers the grains, and so pulverizes it, as to make it impossible to separate it from the flour. I have also ascertained by actual experiment that, the hull can be cracked sufficiently to allow the flour to escape, without crushing or grinding the hull, and by this means, I can produce a flour from buckwheat, as white as that made from wheat, it being a more merchantable article than any heretofore produced. I have also ascertained that, the groove made for the purpose of grinding buckwheat, cannot with the common pick, be dressed sufficiently smooth, to prevent them from crushing and grinding the hulls, as the least inequality in the surface or rubbing part of the grooves will pulverize said hulls, and which produces a dust similar to pulverized charcoal, and darkens the meal. To remedy this defect, I first cut the grooves with the ordinary tool, into something near the desired form, and then with the corner of a bur block placed in the groove, and run forward and back, I put a smooth, round surface on that part of the groove usually denominated the feathered or cutting edge, which separates the hull from the meal, without pulverizing it.

The nature of my invention, therefore, consists first, in rounding off, what is usually denominated the feathered edge of bur, or other mill stones for grinding buckwheat and other grains so as to present a round smooth surface, instead of a cutting edge, as heretofore practised. Second: Polishing, sharpening, straightening and removing the feathered and rough edges of the furrows in mill stones, by rubbing the same with a bur block, after said furrows have been roughed out with a pick or other tool, so as to leave the rubbing surfaces perfectly smooth.

To enable others skilled in the art to make and use my invention, I will proceed to describe the same with reference to the drawings.

Fig. 1 represents the face of a runner stone (the bed stone being dressed so as to have the grooves which are similarly formed, incline in the contrary direction) in which *a*, represents the lands and *b* the grooves. I have here only represented one form of stone, but do not confine myself to any particular shape of groove or land, as they may be varied to suit the fancy of millers. The shape however here shown, I have found to answer an excellent purpose. The sides *c*, of the grooves (the stones being presumed to run in the direction of the red arrows shown in the drawings) are rounded off; and made as smooth as possible, from the nature of the material of which they are composed. This is done by first cutting said grooves as near their intended form as possible with a pick or other tool, and then with the corner or other part of a bur block, run in said groove, polish straighten, and prepare the surfaces, so that as the grooves cross each other "shear fashion" in grinding, the rounded edges of the grooves will merely crack the hull of the buckwheat, without in the least grinding it, and by this means the meal is easily separated afterward, producing a flour equal to the whitest of wheat flour.

The gum which exudes from the grain, and adheres to the stones in grinding buckwheat, has always heretofore, been removed by redressing or recutting the stone—the surfaces being so rough as to retain it, until it becomes perfectly hard. By my process of dressing and rubbing, the gum can be removed by a few runs of the bur block, as above described, in the grooves, and in one tenth of the time usually taken for dressing with a pick. My process consisting virtually, in the substitution of almost polished, rounded surfaces, instead of the feathered or cutting edges heretofore used.

Having thus fully described the nature of my invention, I wish it to be understood that, I do not claim the polishing of one stone, by rubbing it with another of the same material; neither do I claim polishing the face of millstones by rubbing it with another stone, as both these have been essayed; but

What I do claim as my invention, and desire to secure by Letters Patent is—

The rounding off, of what is usually termed the feathered edge of mill stones for grinding buckwheat, so as to present a round smooth surface, instead of a cutting edge as herein set forth; and this I claim whether the furrows are polished, sharpened or straightened, by rubbing the same with a bur-block, after said furrows have been roughed out with a pick or other tool, or by any other means, substantially the same.

WILSON AGER.

Witnesses:
JAS. S. STOUGHTON,
A. B. STOUGHTON.